United States Patent [19]

Seha

[11] 4,021,456
[45] May 3, 1977

[54] PROCESS FOR THE MANUFACTURE OF AMINOANTHRAQUINONES

[75] Inventor: Zdenek Seha, Basel, Switzerland

[73] Assignee: Ciba-Geigy AG, Basel, Switzerland

[22] Filed: May 8, 1975

[21] Appl. No.: 575,565

[30] Foreign Application Priority Data

May 20, 1974 Switzerland .................... 6883/74

[52] U.S. Cl. .............................. 260/378; 260/381
[51] Int. Cl.$^2$ .......................................... C09B 1/16
[58] Field of Search ........................... 260/378, 381

[56] References Cited

UNITED STATES PATENTS

| 2,273,966 | 2/1942 | Klein ................................ 260/378 |
| 2,738,354 | 3/1956 | Kern et al. ...................... 260/378 X |
| 3,417,090 | 12/1968 | Pelster et al. ............... 260/378 UX |

Primary Examiner—Paul F. Shaver
Attorney, Agent, or Firm—Karl F. Jorda; Edward McC. Roberts; Prabodh I. Almaula

[57] ABSTRACT

A process for the manufacture of 1-aminoanthraquinone and derivatives thereof and of diaminoanthraquinones by reduction of 1-nitroanthraquinone and the corresponding derivatives thereof and dinitroanthraquinone, which process comprises the use of a hydronaphthalene as reducing agent and solvent.

4 Claims, No Drawings

PROCESS FOR THE MANUFACTURE OF AMINOANTHRAQUINONES

The present invention provides a process for the manufacture of 1-amino-anthraquinones and derivatives thereof from 1-nitroanthraquinone and the corresponding derivatives as well as diaminoanthraquinones from dinitroanthraquinones, which process comprises the use of a hydronaphthalene as solvent.

1-Aminoanthraquinone, the derivative thereof and diaminoanthraquinones are intermediates for the manufacture of useful anthraquinone dyes or are themselves dyes.

The manufacture of 1-aminoanthraquinones by the reduction of 1-nitroanthraquinone has already been described. Beisler, Jones, Am. Soc. 44, 2304, were able to reduce 1-nitroanthraquinone to 1-aminoanthraquinone by treatment with potassium sulphide in boiling water. On the other hand, 1-aminoanthraquinone and 1-hydroxy-aminoanthraquinone result side by side in the reduction of 1-nitroanthraquinone dissolved in benzene with NaHS in an aqueous calcium chloride solution (Haworth, Lapworth, Soc. 119, 774).

Further, 1-nitroanthraquinone is reduced to 1-amino-anthraquinone by ammonium sulphide (Römer, B. 15, 1787), by sodium hydrosulphite (Boettger, Petersen, A. 166, 147), by sodium sulphide (Lauth, C. R. 137, 662, Bl. [3 ]29,1133), and by alkaline d-glucose solution (Wacker, B.35, 3922). The electrolytic reduction of 1-nitroanthraquinone in acid solution (Möller, Z. El. Ch. 7,741) and in alkaline solution (Möller, Z. El. Ch. 7, 797), and its reduction in aqueous suspension by potassium stannite (Romer) also yield 1-aminoanthraquinone.

The main disadvantage of all these processes is that they do not meet present environmental needs or at least it would prove extremely expensive to render them environmentally clean (effluent, exhaust air).

The purity of the product also leaves something to be desired because the reduction does not yield the product in sufficient quantity so as to avoid the presence in the reaction mixture of small amounts of sulphur and anthraquinone derivatives which contain hydroxy groups and which have to be removed by additional purification operations.

The process according to the invention does not have these drawbacks because a. the reduction with hydronaphthalenes can be carried out without any harmful environmental effects, and b. the hydronaphthalenes have specific selective solvent properties for 1-hydroxyaminoanthraquinones. At room temperature 1-hydroxyaminoanthraquinone has a better solubility in hydronaphthalenes than 1-aminoanthraquinone. For this reason it remains in the circulating mother liquor and does not render the product impure. For example in tetrahydronaphthalene, 1-aminoanthraquinone is only 1% soluble at 20° C and consequently falls out of the reaction solution after cooling in virtually quantitive yield.

It is particularly advantageous that a. the reaction can be carried out without pressure, and b. the hydronaphthalenes can be converted during the reaction into the also useful naphthalene.

Suitable hydronaphthalenes are above all the ordinary commercially available tetra- and decahydronaphthalenes.

The reaction according to the invention is normally carried out at the boiling temperature of the reducing agent and solvent.

The ratio of reducing agent to reduced material, expressed in parts by weight, is between 2:1 to 10:1, advantageously 3:1 to 5:1.

The reaction time can be from 1 to 40 hours and depends on the nature of the reducing agent employed. In this connection, the best results are obtained with tetrahydronaphthalene.

The reduction reaction takes place in homogeneous phase. Upon termination of the reaction, the reaction mixture is cooled, when the virtually insoluble 1-aminoanthraquinone crystallises out. The product is afterwards washed and dried. It is more than 99% pure and the yields are at least 95%.

The excess hydronaphthalene remains in circulation and is made up each time by the requisite amount for the next batch. The naphthalene which is formed during the reduction reaction is removed from the process after repeated reaction cycle either by distillation or by cooling completely and filtration.

The following Examples illustrate the invention but do not limit it to what is described therein. The parts and percentages are by weight.

EXAMPLE 1

25.3 parts of 1-nitroanthraquinone are heated at boiling temperature (208° to 212° C) in 75 parts of tetrahydronaphthalene. The reaction mixture is cooled to room temperature after 1½ to 2 hours, the crystallised product is filtered off, washed with 10 parts of tetrahydronaphthalene and dried. The resultant 1-aminoanthraquinone (21.2 parts = 95% of theory) is 99.5% pure and contains only traces of 1-hydroxyaminoanthraquinone. The mother liquor still contains 0.5 part of 1-aminoanthraquinone and 0.5 part of 1-hydroxyaminoanthraquinone and is used for the next reaction.

EXAMPLE 2

With the same weight ratio as in Example 1 reduction is carried out at app. 190° C using decahydronaphthalene and the reaction mixture is worked up as in Example 1 after a reaction time of app. 4 hours.

The yield and purity of the product are virtually the same as in Example 1.

EXAMPLE 3

26.7 parts of 1-mitro-2-methylanthraqunione are heated at boiling temperature in 150 parts of tetrahydronaphthalene. The reaction mixture is cooled to room temperature after 60 hours, the crystallised product is filtered off, washed with 10 parts of tetrahydronaphthalene and dried. The resultant 1-amino-2-methylanthraquinone (20.5 parts) is more than 98% pure. It is possible to obtain a further 2.5 parts of the product from the mother liquor, so that the total yield is 95% of theory.

EXAMPLE 4

28.8 parts of 1-nitro-5-chloroanthraquinone are heated for 2½ hours at boiling temperature in 160 parts of tetrahydronaphthalene. The reaction mixture is evaporated to dryness. The distillation residue is dissolved in 420 parts of 65% sulphuric acid at 120° C and filtered off at this temperature. The filtrate is diluted with 600 parts of water, the product is filtered off, washed neutral and dried. Yield: 20.7 parts of 1-amino-5-chloroanthraquinone.

EXAMPLE 5

28.8 parts of 1-nitro-8-chloroanthraquinone are heated for 5 hours at boiling temperature in 160 parts of tetrahydronaphthalene. The remainder of the process is carried out as described in Example 4 to yield 20.2 parts of 1-amino-8-chloroanthraquinone.

EXAMPLE 6

29.8 parts of 1,5- or 1,8-dinitroanthraquinone are heated for 45 hours at boiling temperature in 270 parts of tetrahydronaphthalene. The reaction mixture is cooled to room temperature, the crystallised product filtered off, washed with 10 parts of tetrahydronaphthalene and dried. The resulatant 1,5- or 1,8-diaminoanthraquinone (20.8 parts) still contains c. 2 to 4% of intermediate (hydroxyamino derivative).

I claim:

1. A process for the manufacture of 1-aminoanthraquinone and alkyl or halogen substituted 1-aminoanthraquinone, and diaminoanthraquinones, by reduction of 1-nitroanthraquinone and the corresponding alkyl or halogen substituted 1-nitroanthraquinone and dinitroanthraquinones, which process comprises the use of a hydronaphthalene as reducing agent and solvent.

2. A process according to claim 1 which comprises the use of tetrahydronaphthalene.

3. A process according to claim 1 which comprises carrying out the reduction at the boiling temperature of the reducing agent and solvent and isolating the product by crystallisation at room temperature.

4. A process according to claim 1 which comprises the use of the reducing agent and solvent in the weight ratio to the reaction substrate of 2:1 to 10:1.

* * * * *